US011628387B2

(12) United States Patent
Garner et al.

(10) Patent No.: US 11,628,387 B2
(45) Date of Patent: Apr. 18, 2023

(54) APPARATUS AND METHOD FOR FILTERING CRYOGENIC FLUID

(71) Applicant: WESTPORT FUEL SYSTEMS CANADA INC., Vancouver (CA)

(72) Inventors: Gage D. Garner, Vancouver (CA); Timothy S. Coleman, Coquitlam (CA); Ashish Singh, Vancouver (CA); Brendan J. Elder, Delta (CA); Gavin G. Hartnett, North Vancouver (CA); Robbi L. McDonald, Richmond (CA); David Sauve, Burnaby (CA); Cameron G. D. Scott, New Westminster (CA)

(73) Assignee: WESTPORT FUEL SYSTEMS CANADA INC., Vancouver (CA)

( * ) Notice: Subject to any disclaimer, the term of this patent is extended or adjusted under 35 U.S.C. 154(b) by 851 days.

(21) Appl. No.: 16/472,044

(22) PCT Filed: Dec. 22, 2017

(86) PCT No.: PCT/CA2017/051604
§ 371 (c)(1),
(2) Date: Jun. 20, 2019

(87) PCT Pub. No.: WO2018/112670
PCT Pub. Date: Jun. 28, 2018

(65) Prior Publication Data
US 2020/0114289 A1 Apr. 16, 2020

Related U.S. Application Data

(60) Provisional application No. 62/438,896, filed on Dec. 23, 2016.

(51) Int. Cl.
*F04B 37/08* (2006.01)
*B01D 35/027* (2006.01)
(Continued)

(52) U.S. Cl.
CPC ......... *B01D 35/0273* (2013.01); *B01D 29/19* (2013.01); *B01D 29/21* (2013.01);
(Continued)

(58) Field of Classification Search
CPC ...... F04B 37/08; F04B 15/08; B01D 35/0273; B01D 29/21; B01D 2201/12
See application file for complete search history.

(56) References Cited

U.S. PATENT DOCUMENTS 4,655,046 A * 4/1987 Eacobacci ............... F04B 37/08
55/490.2
5,120,434 A 6/1992 Yoshida
(Continued)

FOREIGN PATENT DOCUMENTS

EP 2 541 062 A1 1/2013
EP 2600001 A1 6/2013
(Continued)

OTHER PUBLICATIONS

Extended European Search Report, dated Jul. 1, 2020, for European Application No. 17884194.6, 9 pages.
(Continued)

*Primary Examiner* — Brian M King
(74) *Attorney, Agent, or Firm* — Seed IP Law Group LLP

(57) ABSTRACT

An improved filter apparatus for a cryogenic fluid includes a filter and a support. The filter includes a mesh having an internal space and an open end. The support is associated with the mesh for maintaining a volume of the internal space above a predetermined value. In operation cryogenic fluid enters the internal space through the mesh and exits the open end thereof.

17 Claims, 11 Drawing Sheets

(51) Int. Cl.
    *B01D 29/19*   (2006.01)
    *B01D 29/21*   (2006.01)
    *F04B 15/08*   (2006.01)
    *F17C 1/00*    (2006.01)

(52) U.S. Cl.
    CPC ............... *F04B 15/08* (2013.01); *F17C 1/00* (2013.01); *B01D 2201/0415* (2013.01); *B01D 2201/0461* (2013.01); *B01D 2201/12* (2013.01); *F04B 2015/081* (2013.01); *F17C 2201/0109* (2013.01); *F17C 2201/035* (2013.01); *F17C 2223/0161* (2013.01); *F17C 2227/0142* (2013.01); *F17C 2265/012* (2013.01)

(56) References Cited

U.S. PATENT DOCUMENTS

| | | | |
|---|---|---|---|
| 5,228,299 A * | 7/1993 | Harrington | F04B 37/08 |
| | | | 62/55.5 |
| 5,395,520 A | 3/1995 | Ito et al. | |
| 5,547,568 A | 8/1996 | Sasaki | |
| 9,599,101 B2 | 3/2017 | Lefevre et al. | |
| 9,765,762 B2 | 9/2017 | Papirer et al. | |
| 2005/0150826 A1 | 7/2005 | Sato et al. | |
| 2007/0000259 A1 | 1/2007 | Brook et al. | |
| 2008/0110203 A1 | 5/2008 | May | |
| 2012/0060518 A1 | 3/2012 | Tanaka | |
| 2014/0109599 A1 | 4/2014 | Lefevre et al. | |
| 2015/0013351 A1 * | 1/2015 | Papirer | F04B 53/20 |
| | | | 92/144 |

FOREIGN PATENT DOCUMENTS

| | | |
|---|---|---|
| EP | 2 670 614 A1 | 12/2013 |
| JP | 7-148405 A | 6/1995 |
| WO | 2012/104414 A1 | 8/2012 |

OTHER PUBLICATIONS

European Office Action, dated Jun. 4, 2021, for European Application No. 17 884 194.6-1104, 5 pages.
Chinese Office Action, dated Jul. 6, 2022, for Chinese Application No. 202110794682.8, 8 pages. (with English Translation).
International Search Report and Written Opinion dated Apr. 5, 2018, for International Application No. PCT/CA2017/051604, 8 pages.

* cited by examiner

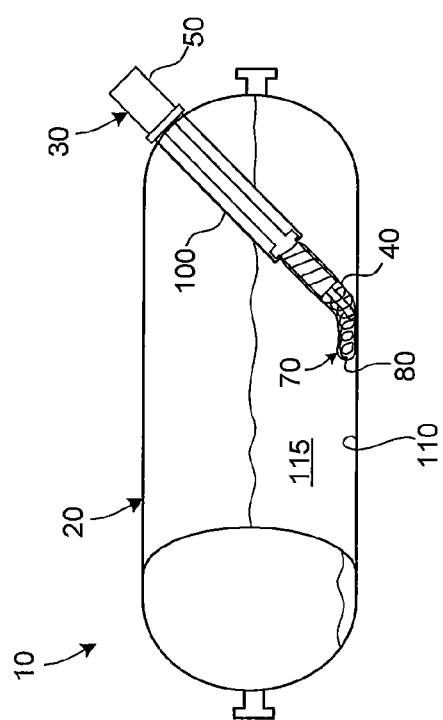
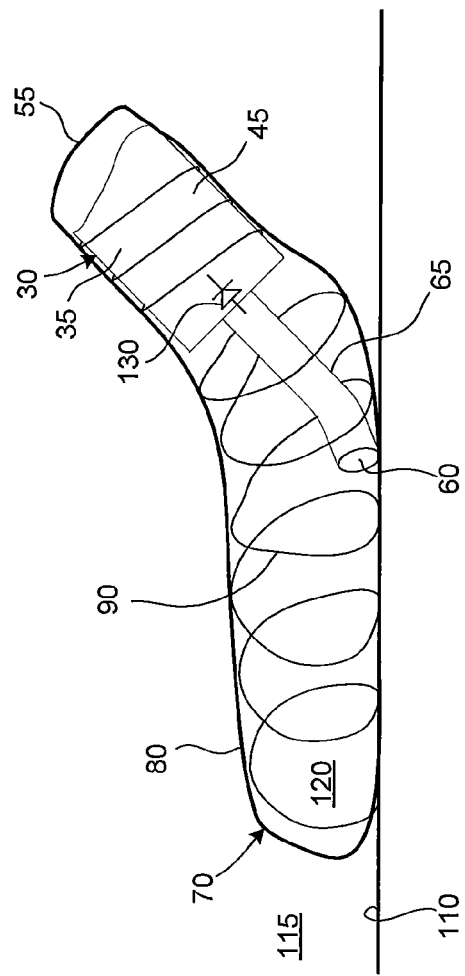

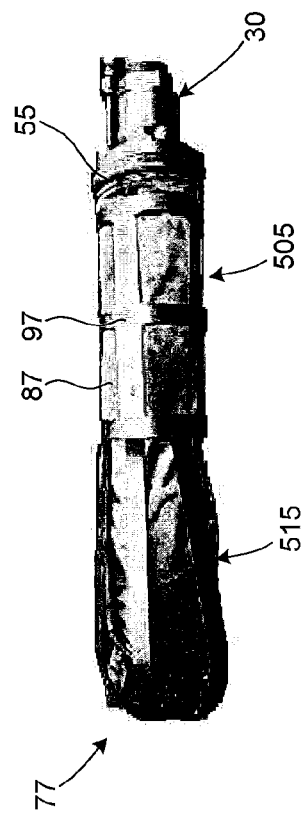
FIG. 17
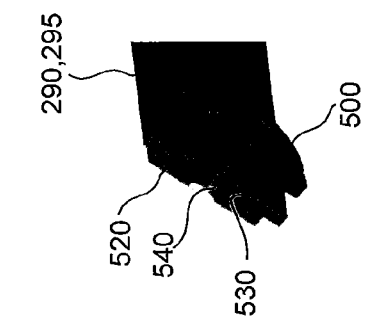
FIG. 20
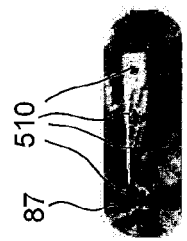
FIG. 21
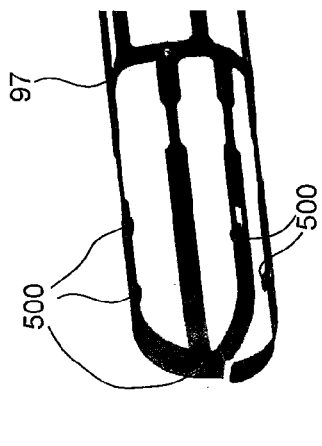
FIG. 18
FIG. 19

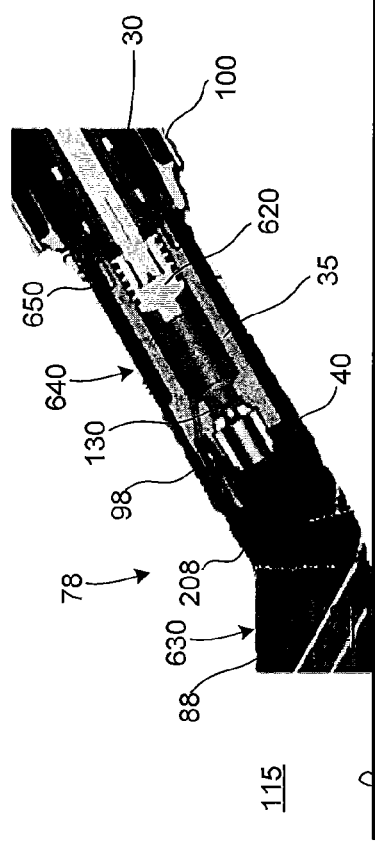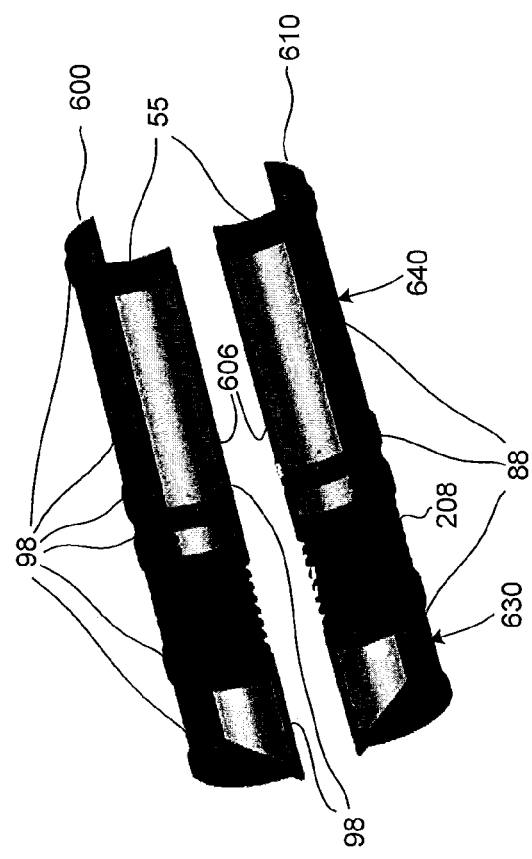
FIG. 22
FIG. 23

APPARATUS AND METHOD FOR FILTERING CRYOGENIC FLUID

FIELD OF THE INVENTION

The present application relates to an apparatus and method for filtering cryogenic fluid, and in particular filtering cryogenic fluid at an inlet for a cryogenic pump, and more particularly a reciprocating piston cryogenic pump.

BACKGROUND OF THE INVENTION

Reciprocating-piston cryogenic pumps include one or more seals around a piston in a compression chamber employed to pressurize process fluid during a compression stroke that was previously drawn into the compression chamber during an intake stroke. Pump performance is directly related to how well the piston seals seal the pressurized process fluid within the compression chamber during the compression stroke. Process fluid that leaks past the seals during the compression stroke is referred to as blow-by fluid, and any amount of blow-by fluid decreases the volumetric efficiency of the pump. Over the life of the pump the piston seal wears as it is moved back and forth along the surface of the compression chamber. As the piston seal wears the amount of blow-by fluid increases and the volumetric efficiency correspondingly decreases. The piston seal wear rate is also influenced by the quality of process fluid, which can be contaminated with debris having particles with a dimension on the order of microns. Contamination increases piston seal wear rate thereby reducing pump performance by degrading the ability of piston seals to effectively perform against the pressure of pumping.

Process fluid can be any cryogenic fluid, such as liquefied gases and liquefied gaseous fuels. As used herein, a liquefied gaseous fuel is defined to be any fuel that is in the gas phase at standard temperature and pressure, that in the context of this application is defined to be zero (0) degrees Celsius (° C.) and one (1) atmosphere (atm) respectively. Exemplary gaseous fuels include butane, biogas, ethane, hydrogen, methane, natural gas and propane, or combinations of these fuels.

Reciprocating-piston cryogenic pumps can be installed within a double-walled, vacuum-insulated cryogenic storage vessel. As an example, the storage vessel can include a pump socket into which the cryogenic pump is installed such that an inlet of the pump is arranged near the bottom of the vessel. This type of cryogenic pump is also referred to as a submerged pump. There can be particle debris in the storage vessel remaining from its fabrication that contaminates the process fluid. During pumping these particles can also lead to increased pump seal wear if not filtered, and decreased volumetric efficiency.

Previous reciprocating-piston, cryogenic pumps included a flexible snorkel at a pump inlet and a filter (for example, a filter matrix) connected to an end of the snorkel. During installation of the pump into the pump socket, the snorkel flexes and bends as the filter matrix contacts the bottom of the vessel allowing the filter matrix to extend horizontally along the bottom of the tank. Even when these filters are present the piston seals continue to wear and the volumetric efficiency of the pump degrades over time.

The state of the art is lacking in techniques for filtering particles from cryogenic fluid before entering an inlet of a cryogenic pump. The present apparatus and method provides techniques for improving the filtering of cryogenic fluids at cryogenic pump inlets.

SUMMARY OF THE INVENTION

An improved filter apparatus for a cryogenic fluid includes a filter and a support. The filter has an internal space and an open end. The support is associated with the filter for maintaining a volume of the internal space above a predetermined value. In operation, cryogenic fluid enters the internal space through the filter and exits the open end thereof, for example into a fluid inlet of a cryogenic pump. The filter can be formed in the shape of a bag or sock. The filter can be mesh, for example made from metal strands.

The support can include one of a coil spring arranged in the internal space of the mesh; a tent-type structure including a frame with flexible rods; a cage spanning at least a portion of the outer and inner surfaces of the mesh; an outer filter on an outer surface of the filter and an inner filter on an inner surface of the filter; an outer cage including a first section and a second section, the first section including annular ribs and longitudinal ribs, the second section including longitudinal ribs extending from the first section and wrapping around an end of the filter; an overmold injection molded onto the filter including a first portion and a second portion, a flexible knee connecting the first portion to the second portion; and a first cylindrical section and a second cylindrical section connected by a flexible knee, the first and second cylindrical sections including perforations.

An improved method for filtering cryogenic fluid includes employing a flexible mesh to filter particles having a maximum dimension that is at least one of 10 microns, 5 microns and 2 microns; and employing a support to maintain a volume of an internal space of the flexible mesh above a predetermined value.

An improved filtering and pumping apparatus including a cryogenic pump and a filter apparatus. The cryogenic pump including a piston reciprocating within a cylinder, the piston dividing the cylinder between a compression chamber and a back-side chamber, the cryogenic pump including a fluid inlet in fluid communication with the compression chamber through a check valve and a port allowing fluid communication between the back-side chamber and the outside of the pump. The filter apparatus including a filter and a support associated with the filter. The filter apparatus is connected to the cryogenic pump and defines an internal space between the filter and the cryogenic pump. The support maintains a volume of the internal space. The filter apparatus is connected to the cryogenic pump such that the internal space includes the fluid inlet, the port and the back-side chamber, whereby fluid exiting the back-side chamber during reciprocating motion of the piston remains within the internal space of the filter.

An improved method for filtering cryogenic fluid includes providing an internal space around a fluid inlet end of a cryogenic pump where the internal space is separated from a cryogen space of a cryogenic storage vessel by a filter. The internal space includes a back-side chamber of a cylinder of the cryogenic pump, where a piston reciprocates within the cylinder, and a port connects the back-side chamber to the internal space outside of the cryogenic pump.

BRIEF DESCRIPTION OF THE DRAWINGS

FIG. 1 is a schematic view of a cryogenic storage and pumping apparatus including a flexible filter apparatus according to a first embodiment.

FIG. 2 is a detail view of the flexible filter apparatus at a fluid inlet end of a cryogenic pump of the cryogenic storage and pumping apparatus of FIG. 1.

FIG. 17 is a side elevational view of a flexible filter apparatus according to a seventh embodiment configured with a cryogenic pump.

FIG. 18 is a perspective view of a cage of the flexible filter apparatus of FIG. 17.

FIG. 19 is a perspective view of a cage with snaps of the flexible filter apparatus of FIG. 17

FIG. 20 is a perspective view of one of the snaps of the cage of FIG. 19.

FIG. 21 is a detail view of a filtering medium with snaps of the flexible filter apparatus of FIG. 17.

FIG. 22 is a side elevational view of a flexible filter apparatus according to an eighth embodiment configured with a pump that is installed in a storage vessel.

FIG. 23 is a perspective view of first and second halves of the flexible filter apparatus of FIG. 22.

DETAILED DESCRIPTION OF PREFERRED EMBODIMENT(S)

Figure 3:
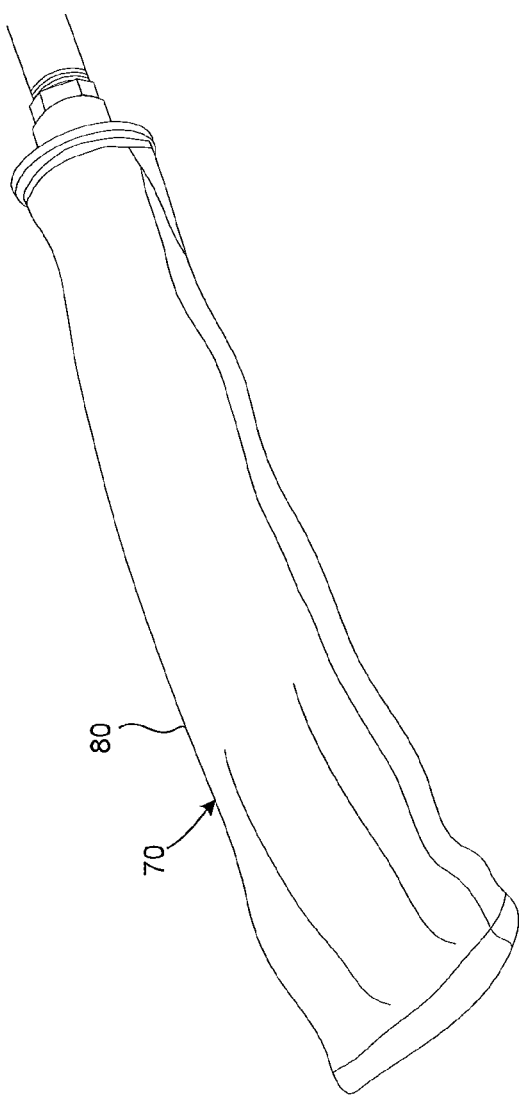
FIG. 3 is a perspective view of the flexible filter apparatus at a fluid inlet end of a cryogenic pump of the cryogenic storage and pumping apparatus of FIG. 1.
Figure 4:
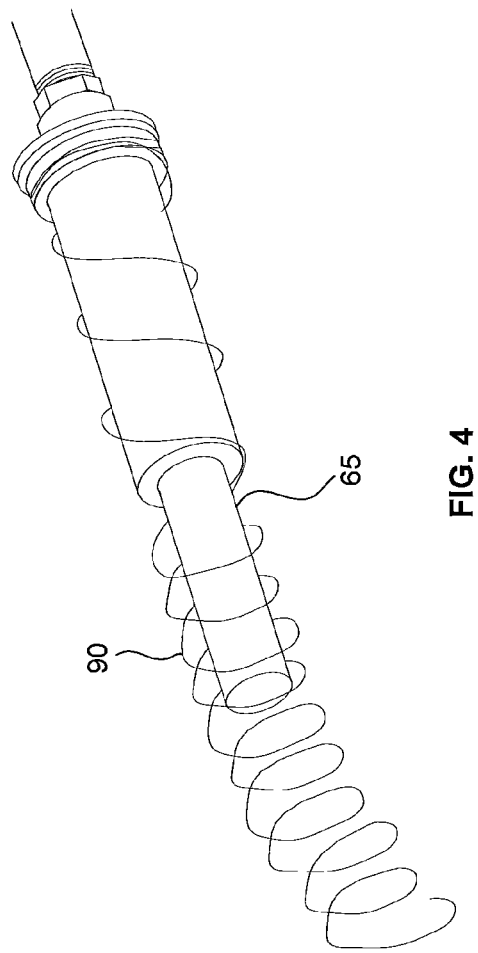
FIG. 4 is a perspective view of the flexible filter apparatus of FIG. 3 with a filter bag removed.

Referring generally to FIGS. 1, 2, 3 and 4 and first to FIG. 1 there is shown cryogenic storage and pumping apparatus 10 including cryogenic storage vessel 20 and cryogenic pump 30. In the illustrated embodiment apparatus 30 is a reciprocating-piston, cryogenic pumping apparatus including inlet end 40 and outlet end 50. Cryogenic fluid enters inlet 60 during an intake stroke of pump 30 and pressurized cryogenic fluid exits an outlet (not shown) located at end 50 during a compression stroke. The cryogenic fluid entering inlet 60 is in the liquid phase and pressurized fluid exiting the outlet may be in the gas phase and/or the supercritical phase, depending on the pressure and temperature of the fluid.

Flexible filter apparatus 70 filters debris/particle contamination from the cryogenic fluid in cryogen space 115 before it is drawn into inlet 60. Apparatus 70 includes filter 80 and support 90. Filter 80 is a filtering medium, and in particular in the illustrated embodiment a flexible mesh in the form of an elongated bag or sock having open end 55, and which envelopes support 90 and inlet end 40 of cryogenic pump 30. As used herein all filters comprise a filtering medium. The mesh can be formed by metal strands. Open end 55 is fluidly sealed with respect to outer surface 45 of pump 30. In an exemplary embodiment, the mesh of filter 80 blocks particles having a dimension on the order of 10 microns, and more preferably on the order of 5 microns, and most preferably on the order of 2 microns. It has been shown that particles within this range can substantially increase the wear rate of seals within cryogenic pump 30. By filtering these particles before entering inlet 60 the seal wear rate can be reduced and the life of the seals can be extended and the volumetric efficiency of the pump improved.

Support 90 is a flexible, internal support in the form of a spring (for example, a coil spring, also known as a helical spring) that keeps filter bag 80 expanded outwardly thereby preserving a volume of internal space 120 above a predetermined value. Both filter 80 and support 90 are conformable allowing apparatus 70 to deflect upon impacting floor 110. Support 90 allows internal space 120 to contract during intake strokes of pump 30, thereby reducing the pressure drop, and to expand during compression strokes. The mesh of filter 80 is so fine there is a relatively low(er) pressure drop at low flow rates through pump 30 and a relatively high(er) pressure drop at high flow rates. The flexing of filter 80 and support 90 reduces the pressure drop across intake check-valve 130 of pump 30 during intake strokes improving the volumetric efficiency of the pump. Check-valve 130 is a one-way valve. During compression strokes of pump 30, when the mass flow of cryogenic fluid into inlet 60 and through check-valve 130 stops and mass flow through an outlet check-valve (not shown) starts, space 120 is expanded by flexible support 90. Cryogenic fluid can be drawn across filter 80 during both intake and compression strokes. The expanded volume of space 120 (when support 90 fully expands filter 80) is selected such that pump 30 maintains a predetermined volumetric efficiency at a predetermined mass flow rate, for example the maximum mass flow rate of the pump, and under this criteria the finer the mesh of filter 80 the greater the expanded volume.

Flexible filter apparatus 70 is conformable such that as pump 30 is installed into pump socket 100 upon impacting floor 110 the filter apparatus deflects and conforms/extends along the floor 110 of storage vessel 20. In the illustrated embodiment, inlet 60 is an open end of conduit 65 that is flexible such that it also conforms upon impacting floor 110 (best seen in FIG. 2). Conduit 65 is also known as a snorkel and can be in the form of a bellows.

Flexible filter bag construction can allow for increased surface area compared to standard rigid filter designs, when installed into limited geometry tanks (such as pump socket 100 in pump 30) or non-standard shaped filter housings. Flexible filter bag construction is advantageous to work in reciprocating-piston-type pumps where fluid is only drawn into a compression chamber during the retract stroke and there is negligible (if any) flow through the filter during the compression stroke.

Figure 5:
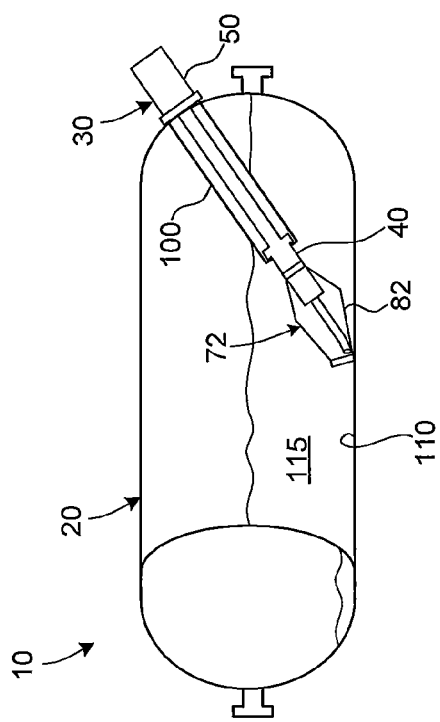
FIG. 5 is a schematic view of a cryogenic storage and pumping apparatus including a flexible filter apparatus according to a second embodiment.
Figure 7:
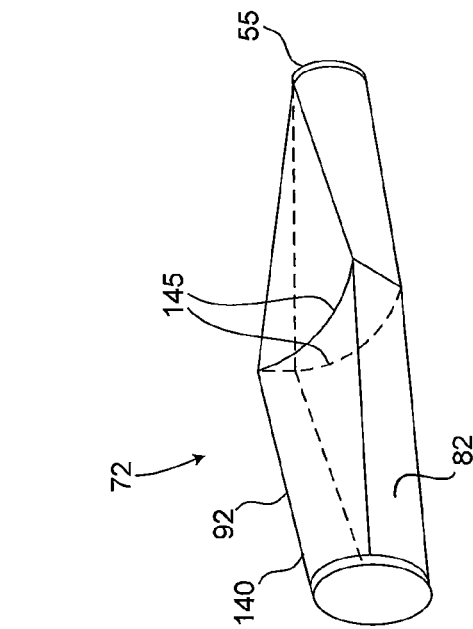
FIG. 7 is a perspective of the flexible filter apparatus of FIG. 5 illustrated in a contracted position.
Figure 6:
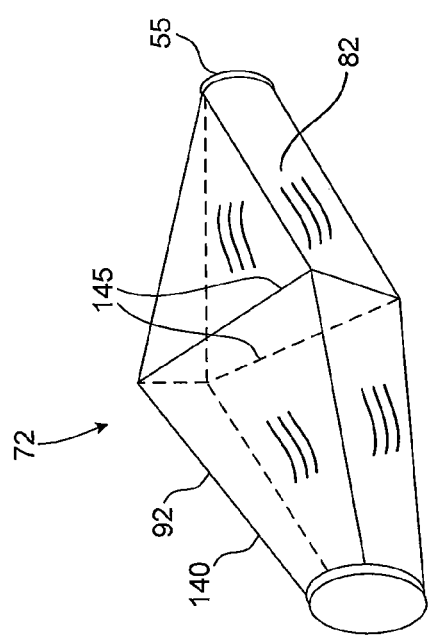
FIG. 6 is a perspective of the flexible filter apparatus of FIG. 5 illustrated in an expanded position.

Referring now generally to FIGS. 5, 6 and 7 there is shown flexible filter apparatus 72 according to a second embodiment where like parts to the previous and other embodiments have like reference numerals and may not be discussed in detail if at all. Flexible filter apparatus 72 is a flexible, umbrella-type or tent-type structure that collapses when pump 30 is inserted through pump socket 100, and expands when inside storage vessel 20. Filter 82 envelopes support 92. In an exemplary embodiment support 92 includes frame 140 with flexible rods 145 that are biased to maintain filter apparatus 72 in an expanded position illustrated in FIG. 6, and bendable to allow the filter apparatus into a collapsed position illustrated in FIG. 7. Filter apparatus 72 includes filter 82 that is a flexible, mesh-type filter in the form of a filter bag or cloth similar to filter 80.

Figure 9:
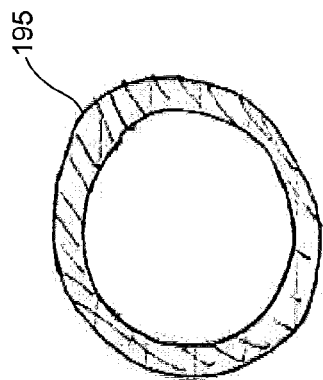
FIG. 9 is a cross-section view of the flexible filter apparatus of FIG. 8 taken along an annular rib of a support.
Figure 8:
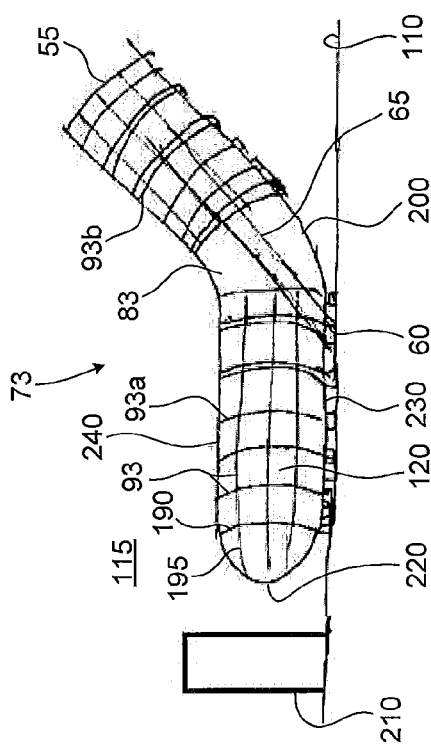
FIG. 8 is an elevational view of a flexible filter apparatus according to a third embodiment and a receptacle for the flexible filter apparatus.
Figure 10:
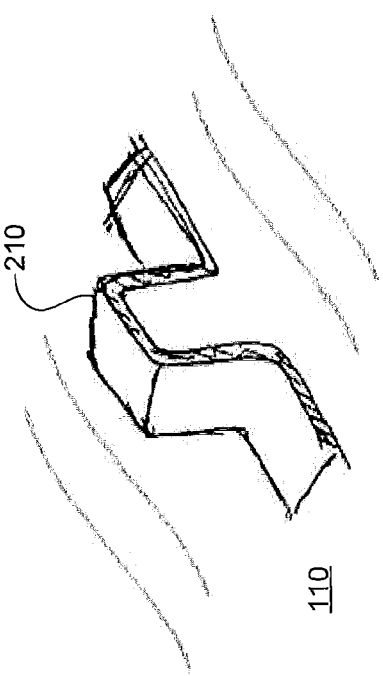
FIG. 10 is a perspective view of the receptacle of FIG. 8.

Referring now to FIGS. 8 and 9 there is shown flexible filter apparatus 73 according to a third embodiment that filters debris/particles from fluid drawn into inlet 60 of a cryogenic pump (not shown) and includes filter 83 and support 93. Filter 83 is similar to filter 80 in FIG. 1, a flexible, mesh-type filter in the form of a filter bag, sock or cloth with a similar mesh size. Support 93 is a cage that spans at least a portion of outer and inner surfaces of the filter and maintains a volume of the internal space of filter 83 above a predetermined value. Cage-like support 93 includes a plurality of annular ribs 190 and a plurality of longitudinal ribs 195. In an exemplary embodiment, support 93 is an overmold that is injection molded onto filter 83. Filter 83 can be a bag or sock that is inserted into a plastic injection mold (not shown) such that structure 93 is injection molded on and through filter 83 forming the cage-like structure. Alternatively, instead of injection molding a 3D pen can be employed to manually form cage-like structure 93 around filter 83. In the illustrated embodiment support 93 is formed in two portions 93a and 93b such that as filter apparatus 73 is inserted into a pump socket (like pump socket 100 in FIG. 1) portion 93a deflects upon impacting floor 110 of the cryogenic storage vessel, bending at knee 200 and extending along the floor. Bendable knee 200 can be in the form of an accordion-type or a bellows-type of structure. In other embodiments support 93 can be a unitary structure spanning portions 93a and 93b and there in between, as long as the structure is conformable allowing it to deflect and bend upon hitting the floor to extend therealong. Support 93 may be made from a polyethylene material, or any plastic that has sufficient compliance at cryogenic temperatures (during installation or removal). In the context of this application cryogenic temperatures are defined to be temperatures at or below −150 degrees Celsius.

A thickness of annular ribs 190 can be selected such that filter 83 is spaced apart from floor 110. In certain applications, such as mobile applications, vibrations can cause filter 83 to wear if it is rubbing against a surface, such as floor 110. In an exemplary embodiment the thickness of annular ribs 190 is uniform around its circumference, or alternatively it can be thicker around the portion of the circumference contacting floor 110.

Receptacle 210 is affixed to floor 110 of the cryogenic storage vessel (for example, by a weld or a fastener) and receives and supports end 220 of filter apparatus 73 to restrict its movement away from floor 110. Side 230 of filter 80 preferably is adjacent but slightly spaced apart from floor 110, to increase and preferably maximize the amount of fluid that can be filtered and pumped from cryogen space 115, and to reduce and preferably eliminate abrasion on filter 80 from the floor due to vibrations. During normal operation of the cryogenic pump within a cryogenic storage vessel (like vessel 20 in FIG. 1) filter apparatus 73 can be moved around from the sloshing of fluid within the cryogenic storage vessel, especially in mobile applications, if not supported by receptacle 210. Additionally, there can be a lifting force on filter apparatus 73 imparted from a buoyancy effect of bubbles created by the boiling of cryogenic fluid within internal space 120 that float towards side 240. Receptacle 210 can also be employed with filter apparatuses 70 and 72 of FIGS. 1 and 5 respectively. Alternatively, end 220 can be loaded with a weight that keeps the end down when under the influence of the above mentioned forces. For example, in all embodiments herein a weight can be placed inside the filter bag (that is in internal space 120) to weigh the filter bag down against floor 110. Alternatively or additionally, a magnet can be placed somewhere in internal space 120 such that it makes a magnetic bond with floor 110 or with a magnetic element on the outside of floor 110 such that the filter is kept against floor 110.

Figure 11:
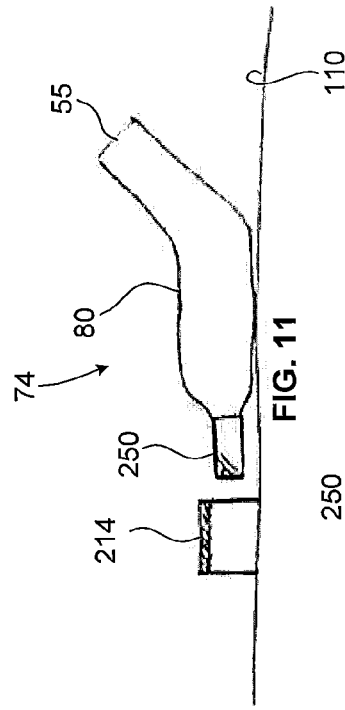
FIG. 11 is a side elevational view of a flexible filter apparatus according to a fourth embodiment and a receptacle for the flexible filter apparatus.
Figure 12:
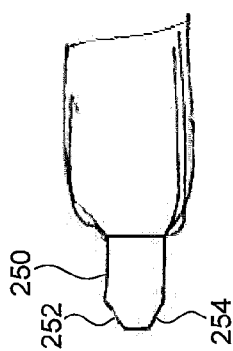
FIG. 12 is a plan view of the flexible filter apparatus of FIG. 11.

Referring now to FIGS. 11 and 12, there is shown flexible filter apparatus 74 according to a fourth embodiment. In the illustrated embodiment flexible filter apparatus 74 is similar to filter apparatus 70 and additionally includes end member 250. Receptacle 214 receives and supports end member 250 for the same reasons receptacle 210 supports filter apparatus 73. End member 250 is tapered with sloped portions 252 and 254, and in other embodiments end member 250 can be tapered like a cone. The tapered end improves the ability of end member 250 to be guided into receptacle 214. Receptacle 214 can be tapered internally, with a wide opening to permit the successful reception of end member 250 within the receptacle under varying amounts of misalignment therewith, and narrowing inwards to secure the end member in place when fully received therein. In other embodiments other filter apparatuses described herein can employ end member 250.

Figure 13:
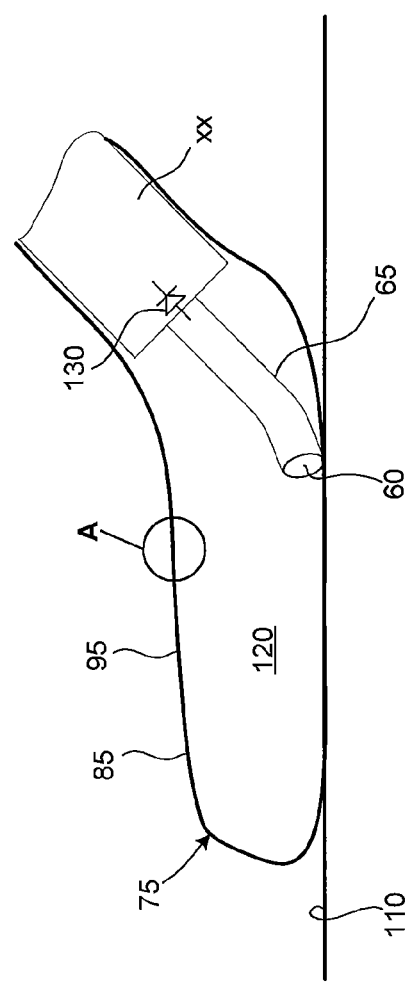
FIG. 13 is an elevational view of a flexible filter apparatus according to a fifth embodiment.
Figure 14:
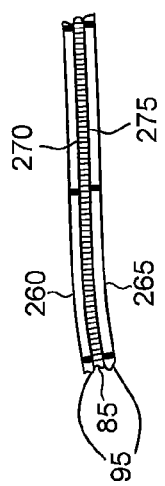
FIG. 14 is a partial view of the flexible filter apparatus of FIG. 13 around detail A.

Referring now to FIGS. 13 and 14 there is shown filter apparatus 75 according to a fifth embodiment including filter 85 sandwiched by support 95. Filter 85 comprises a fine mesh similar to filter 80 (shown in FIG. 2). Support 95 includes coarse mesh 260 on outer surface 270 of filter 85 and coarse mesh 265 on inner surface 275 of the filter. Meshes 260 and 265 are also similar to filter 80 except that the coarse mesh is sized to block larger particles compared to the fine mesh, such as particles having a dimension equal to 50 microns or greater. The coarse mesh is formed by strands large enough such that it can retain its shape when formed into the shape of a bag or sock. Coarse meshes 260 and 265 can be a metal material that is sintered onto filter 85, for example forming sheets of layered meshes that are then formed into a bag/sock-like shape.

Figure 15:
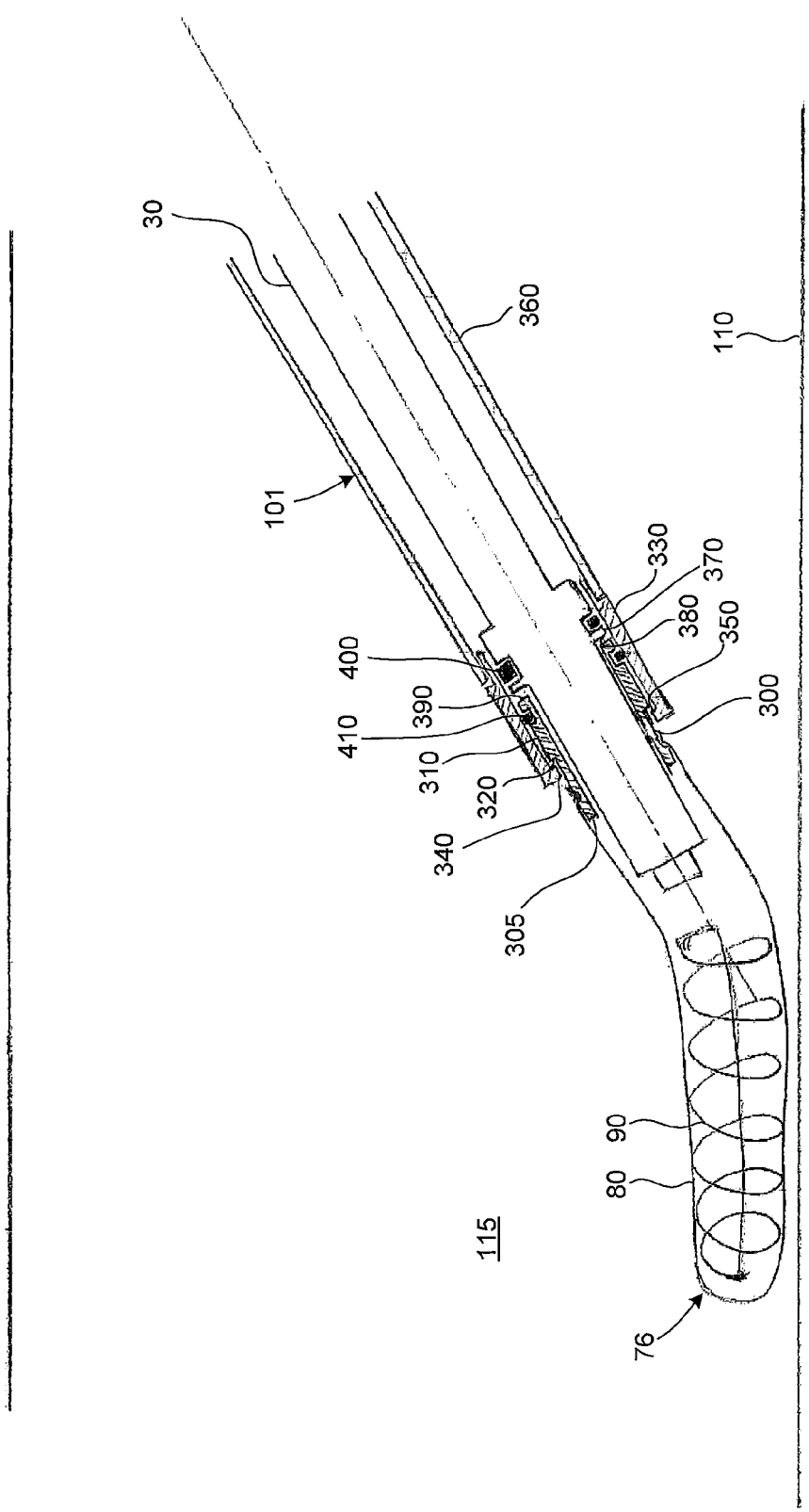
FIG. 15 is a side elevational view of a flexible filter apparatus according to a sixth embodiment.
Figure 16:
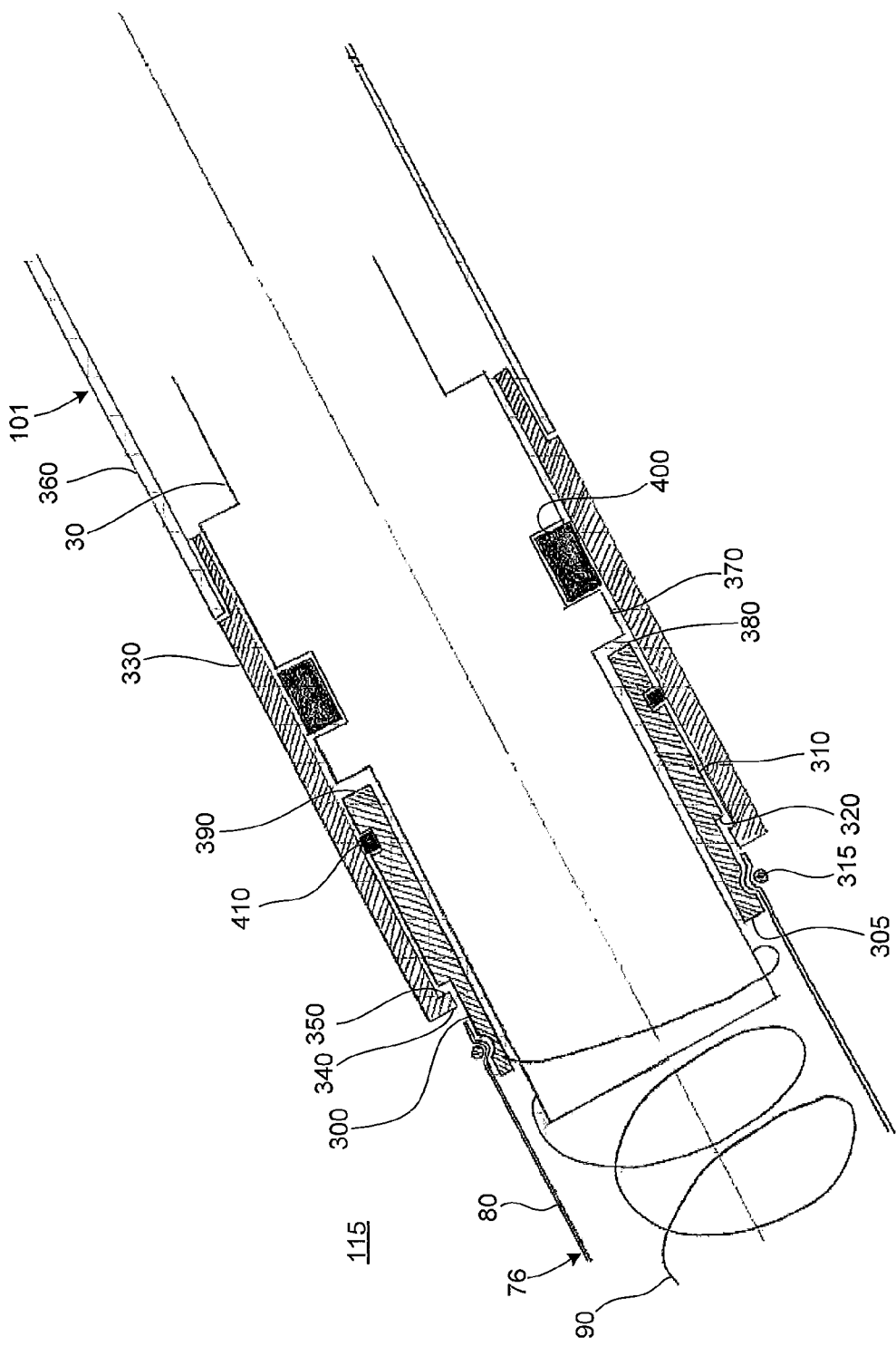
FIG. 16 is a detail view of the flexible filter apparatus of FIG. 15.

Referring now to FIGS. 15 and 16 there is shown filter apparatus 76 according to a sixth embodiment. Filter apparatus 76 includes filter 80 fluidly sealed and connected with sleeve 300. End 305 of sleeve 300 is inserted into open end 55 of filter 80 (seen in FIG. 2) such that the filter is then secured to the sleeve by wire 315, or alternatively by a flexible seal such as an o-ring, an adhesive or a weld. In the illustrated embodiment filter apparatus 76 also includes coil-spring support 90, an end of which is connected to sleeve 300 before filter 80 is connected thereto. In other embodiments filter apparatus 76 can include the filter and the support as used in filter apparatuses 72, 73, 74 and 75 (seen in FIGS. 6, 8, 11 and 13 respectively). Referring again to FIGS. 15 and 16, sleeve 300 includes flange 310 that forms annular ledge 320 and end 390. In the illustrated embodiment pump socket 101 includes sleeve 330 having flange 340 with annular ledge 350. However, in other embodiments sleeve 330 and socket portion 360 can be a unitary component. Pump 30 includes flange 370 having annular ledge 380, which in other embodiments can be a portion of the pump where the diameter increases step wise. Seal 410 fluidly seals sleeve 300 with sleeve 330, and seal 400 seals pump 30 with sleeve 330. Seals 400 and 410 fluidly seal cryogen space 115 from the environment outside the cryogenic storage vessel. Filter apparatus 76 is inserted first into pump socket 101 before (and separately and independently) from pump 30 such that ledge 320 abuts against ledge 350. Pump 30 is then inserted into pump socket 101 such that ledge 380 abuts end 390 of sleeve 300. By separating filter apparatus 76 from pump 30, and thereby inserting the filter apparatus separately and independently of the pump, the insertion process is simplified and the likelihood of damaging the filter apparatus is reduced. The insertion process is simplified since it is challenging to insert an assembly that has a leading flexible portion (filter apparatus 76) followed by a long rigid portion (pump 30). The likelihood of damaging filter apparatus 76 is reduced since its insertion is made visible to the installer, who can then exercise more caution over and receive immediate feedback during the insertion process.

Referring now to FIGS. 17 through 21 there is shown flexible filter apparatus 77 according to a seventh embodiment. Apparatus 77 includes filter 87 surrounded and supported by support 97. Filter 87 can be similar to filter 80 of FIG. 1. Support 97 is in the form of a cage including annular ribs 290 and longitudinal ribs or fingers 295. In the illustrated embodiment there are three annular ribs 290 and six longitudinal ribs 295, and in other embodiments there can be a different number of either or both of the annular and longitudinal ribs. Apparatus 77 includes first section 505 and second section 515. Section 505 comprises annular ribs 290 spaced apart and secured in space relative to each other by longitudinal ribs 295. Section 515 includes longitudinal fingers 295 extending away from annular ribs 290 at one end and wrapping around filter 87 towards each other at end 550. Longitudinal fingers 295 are separate and independent from each other at end 550. There can be a different number of longitudinal ribs in section 505 compared to section 515. Section 505 envelopes cylinder 35 of pump 30 (best seen FIG. 22). In an exemplary embodiment cage 97 can be fabricated from sheet metal. Cage 97 includes snaps 500 that are mutually engageable with snaps 510 on filter 87 to anchor the filter within the cage. In the illustrated embodiment snaps 500 are female snaps and snaps 510 are male snaps, although the opposite arrangement is possible in other embodiments. In an exemplary embodiment snap 500 can be connected to either rib 290 or 295 by way of connecting tee 520 extending through bore 530 of the rib and connecting to the snap, thereby forming a fluid seal with respect to the bore. Channel 540 formed through snap 500 and tee 520 receives the male portion of snap 510. Snaps 500 and 510 form a fluid seal with ribs 290 and 295 when connected with each other. Apparatus 77 is conformable during installation into a pump socket, such as pump socket 100 illustrated in FIG. 1, and each finger 295 can deflect independently and separately from other fingers when impacting floor 110 (or any other structure that may reside within the storage vessel 20) allowing filter 87 to extend along the floor bottom. Longitudinal fingers 295 protect the entire length of the filter 87 during installation and removal of apparatus 77 into and from the pump socket respectively.

Referring now to FIGS. 22 and 23 there is shown flexible filter apparatus 78 according to an eighth embodiment. Apparatus 78 comprises filter 88 and support 98. Filter 88 is similar to filter 83 in FIG. 8. Support 98 is an overmold that is injection molded onto filter 88, similar to apparatus 73 of FIG. 8. Knee 208 is an accordion-type or bellows-type structure between portion 630 and portion 640 of apparatus 78 allowing the apparatus to conform when impacting floor 110 of the storage vessel and to extend therealong. Portion 630 and portion 640 of structure 98 each including part of filter 78, where the filter can be split into two or more sections. Apparatus 78 includes first section 600 and second section 610 that are equivalent halves in the illustrated embodiment, but which can be disproportionate sections in other embodiments. In further embodiments there can be more than two sections. Sections 600 and 610 are connected to each other, for example by welding, such as ultrasonic welding, or alternatively by an adhesive or epoxy material. In the circumstance when an adhesive or epoxy is used they must be able to function in cryogenic temperatures. Section 600 is fluidly sealed with respect to section 610 between respective perimeters 606 of support 98 when the sections are connected to each other. Portion 640 of apparatus 78 envelopes cylinder 35 in FIG. 22 where piston 620 is illustrated in a fully retracted position (that is, after a complete intake stroke). Conduit (or port) 650 connects the backside of piston 620 (that is, the side that is opposite intake check-valve 130) with internal space 120 of apparatus 78. Preferably, in all embodiments herein internal space 120 of each filter apparatus is in direct fluid communication with a backside chamber with respect to the piston within the cylinder of the pump, such that the backside chamber is an extension of the internal space, as will be explained in more detail below.

Figure 25:
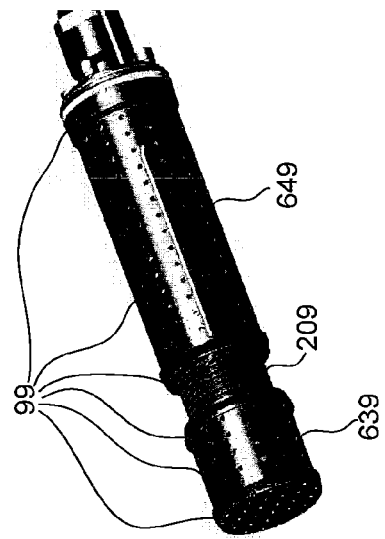
FIG. 25 is a perspective view of the flexible filter apparatus of FIG. 24 illustrated.
Figure 24:
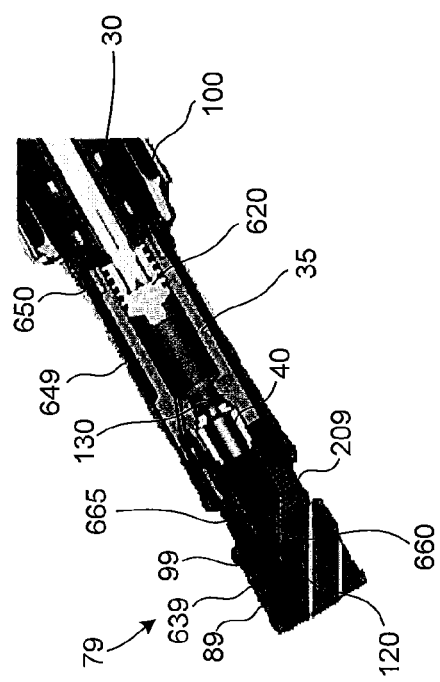
FIG. 24 is a side elevational view of a flexible filter apparatus attached to a pump according to an eighth embodiment.
Figure 26:
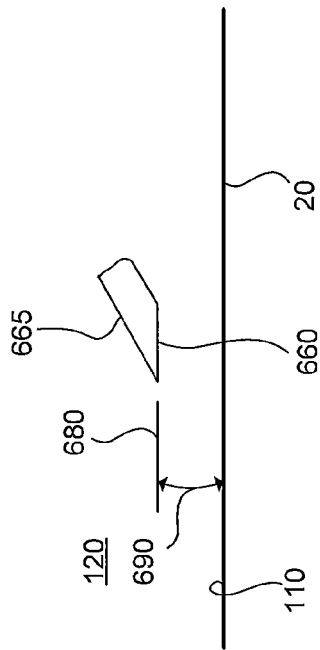
FIG. 26 is an elevational plan view of a portion of an inlet conduit for a cryogenic pump.

Referring now to FIGS. 24 and 25 there is shown flexible filter apparatus 79 according to a ninth embodiment. Apparatus 79 includes filter 89 and support 99. Support 99 includes sections 639 and 649 connected by flexible knee 209. Filter 89 is overlaid over sections 639 and 649 on the outside. Filter 89 can be similar to filter 80 in FIG. 1. Sections 639 and 649 are rigid cylinders having perforations large enough to allow cryogenic fluid filtered by filter 89 to pass through with negligible pressure drop. In an exemplary embodiment sections 639 and 649 can be metallic cylinders. Alternatively, materials that can tolerate cryogenic temperatures and that can be formed into a rigid cylinder that structurally supports filter 89 can also be employed. Accordion-type or bellows-type knee 209 separates portions 639 and 649 and allows apparatus 79 to conform when installed into a storage vessel (not shown in the illustrated embodiment). In other embodiments filter 89 can be a pleated-type or a corrugated-type filter. A pleated or corrugated filter is advantageous since it increases the effective surface area of the filter thereby reducing the pressure drop across the filter during intake strokes of piston 620. In further embodiments a pleated or corrugated filter can be employed that is structurally sound such that support 99 is not required. In these circumstances portions 639 and 649 would be replaced by respective pleated or corrugated filters and these pleated or corrugated filters would be connected by a knee, such as knee 209. In still further embodiments, there can be more than two sections of pleated or corrugated filters with each side-by-side pair of pleated or corrugated filters connected with a respective bendable knee in the form of an accordion-type or bellows-type structure. Conduit 665 includes inlet 660 that is an open end into which fluid is drawn during intake strokes of piston 620. Inlet 660 lies within plane 680 and preferably plane 680 is parallel to floor 110 of storage vessel 20. In other embodiments plane 680 can form angle 690 with floor 110 where angle 690 can be up to 45 degrees, and more preferably up to 30 degrees, and even more preferably up to 15 degrees, and still more preferably up to 5 degrees. Conduit 665 can be employed in all embodiments disclosed herein. During operation of cryogenic pump 30 bubbles tend to form within internal space 120 and these bubbles float to the top of the internal space over time. It is preferable to locate inlet 660 adjacent floor 110 such that during intake strokes the bubbles within internal space 120 are not drawn into cylinder 35, or a reduced number of bubbles are drawn into cylinder 35, which increases the efficiency of cryogenic pump 30.

In all the embodiments herein a sleeve can be employed during installation of filter apparatuses 70, 72, 73, 74, 75, 77, 78 and 79 through pump socket 100 to reduce and preferably prevent abrasion between filter 80, 82, 83, 85, 87, 88 and 89 and an inner surface of the pump socket. The filter apparatuses can employ a strip attached along a side adjacent floor 110. The strip is made from a material that is more abrasion resistant than the filtering medium. In filter apparatus 77 in FIG. 17 longitudinal fingers 295 substantially protect filter 87 during installation and act as the strip, although an installation sleeve may reduce the risk of filter damage even further.

Referring to FIGS. 22 and 24, the internal volume of cylinder 35 in cryogenic pump 30 is divided into a compression chamber and a back-side chamber by piston 620 that reciprocates between intake (retract) strokes and compression (extend) strokes. The compression chamber is fluidly connected to internal space 120 through intake check valve 130 and to cryogen space 115 (best seen in FIGS. 1 and 2) through one of filters 80, 82, 83, 85, 87, 88 and 89 described herein. Check valve 130 is open during intake strokes and closed during compression strokes. The back-side chamber is fluidly connected to internal space 120 by way of conduit (or port) 650 formed in cylinder 35 and to cryogen space 115 through one of filters 80, 82, 83, 85, 87, 88 and 89 described herein that effectively cover cylinder 35. During reciprocating pumping action of piston 620 cryogenic fluid in the back-side chamber sloshes in and out of the chamber through port 650. This cryogenic fluid combined with the cryogenic fluid in internal space 120 surrounding cylinder 35 heats up due to the heat of compression and from friction of seals between piston 620 and cylinder 35. Filters 80, 82, 83, 85, 87, 88 and 89 effectively reduces the likelihood of the warmed cryogenic fluid from dispersing back into cryogenic space 115, and instead substantially keeps the warmed cryogenic fluid within internal space 120 where it is eventually drawn into cylinder 35 during an intake stroke. Filters 80, 82, 83, 85, 87, 88 and 89 act as thermal barriers around the pump, and in particular cylinder 35, and trap the warmed cryogenic fluid within internal space 120 thereby reducing the heat leak into cryogen space 115. Any heat leak from pump 30 into cryogen space 115 increases the tank vapor pressure and the temperature of the cryogenic fluid, which reduces the hold time of the cryogenic fluid within the tank. The hold time is the time it takes for heat leak into the tank to increase tank vapor pressure to a critical pressure where a pressure relief valve is activated to evacuate cryogenic fluid to maintain tank vapor pressure below the critical pressure. An additional benefit in including port 650 and back-side chamber in internal space 120 is that only filtered cryogenic fluid flows through the port into the back-side chamber, which reduces particle contamination of the seals employed around the piston thereby increasing their operating life.

Figure 27:
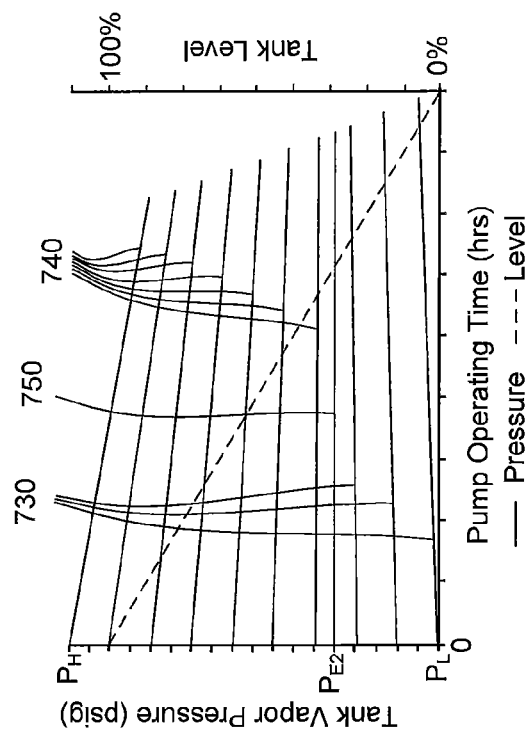
FIG. 27 is a chart view of tank pressure versus operation time for a cryogenic pumping system employing a conventional snorkel filter.
Figure 28:
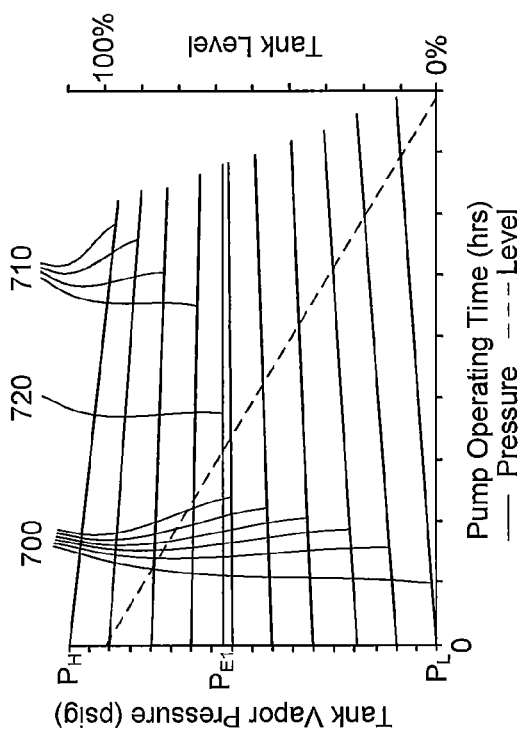
FIG. 28 is chart view of tank pressure versus operation time for a cryogenic pumping system employing a flexible filter apparatus

Referring now to FIGS. 27 and 28 there are shown tank pressure versus time charts that illustrate a benefit of the flexible filter apparatuses disclosed herein. FIG. 27 illustrates data generated from simulations of pumping a cryogenic pump that employs a conventional snorkel filter. A conventional snorkel filter connects directly to an inlet conduit, has an internal space that is not connected to the back-side chamber, and filters particles on the order of 100 microns in size. FIG. 28 illustrates data gathered from simulations of pumping a cryogenic pump that employs flexible filter apparatus 77 of FIG. 17. The models employed for both simulations were created from respective empirical test data using real world prototypes. These charts each illustrate multiple simulations of the effects of pumping on tank vapor pressure and cryogenic fluid temperature after starting with a full tank of cryogenic fluid at varying pressure and temperature each time. At time zero the tank is filled with cryogenic fluid and each solid line represents a cryogenic fluid of a different initial temperature. As the initial temperature of the cryogenic fluid increases so too does the initial tank vapor pressure. Stated another way a higher initial tank vapor pressure means a warmer fuel with a higher equilibrium vapor pressure. With reference to FIGS. 27 and 28, pressure lines 700 and 730 represent simulations where tank vapor pressure increases after pumping the cryogenic fluid from the tank over time, and as tank vapor pressure increases so too does the temperature of the cryogenic fluid within the tank. Pressure lines 710 and 740 represent simulations where tank vapor pressure decreases after pumping the cryogenic fluid from the tank over time, and as tank vapor pressure decreases so too does the temperature of the cryogenic fluid within the tank. Pressure lines 720 and 750 represent the equilibrium point where tank vapor pressure and cryogenic fluid temperature remains constant as the cryogenic fluid is pumped out of the tank. As the figures illustrate, equilibrium pressure $P_{E2}$ for the system that employs the flexible filter apparatus of FIG. 17 is lower compared to the equilibrium pressure $P_{E1}$ for the system that employs a conventional snorkel filter. By employing one of the flexible filter apparatuses (70, 72, 73, 75, 77, 78 and 79) disclosed herein, the tank vapor pressure rise within the tank can be reduced, that is the tank vapor pressure is reduced, as the cryogenic pump operates compared to previous cryogenic pumping systems. Cryogenic tank hold times are increased when tank vapor pressure is reduced while operating the cryogenic pump. The tank hold time is the amount of time before the vapor pressure within the cryogenic tank increases to a critical pressure at which point it is purposefully vented through a pressure relief valve. When the tank vapor pressure is pulled to a lower level by operating the cryogenic pump, then when the pump stops operating the hold will beneficially increase. This reduces wasted fuel thereby reducing the operating cost of a downstream consumer of the cryogenic fluid, such as an internal combustion engine that consumes a cryogenic fuel like liquid natural gas.

Filters 80, 82, 83, 85, 87, 88 and 89 can in alternative embodiments comprise a sintered filtering medium, for example such as one of or a combination of a sintered metal filter, a sintered mesh filter, a plied sintered metal filter. Flexible sintered filtering mediums require one of the supports 90, 92, 93, 95, 97, 98 and 99 disclosed herein. Rigid sintered filtering mediums can be employed without one of these support structures other than connecting flange or structure to connect it to the cryogenic pump.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A filter apparatus for a cryogenic fluid comprising:
a filter comprising an internal space and an open end; and
a support associated with the filter for maintaining a volume of the internal space above a predetermined value, the support including at least one support selected from:
a coil spring arranged in the internal space of the filter,
a tent-type structure comprising a frame with flexible rods,
a cage spanning at least a portion of an outer surface and an inner surfaces of the filter,
an outer filter on an outer surface of the filter and an inner filter on an inner surface of the filter,
an outer cage comprising a first section and a second section, the first section comprising annular ribs and longitudinal ribs, the second section comprising longitudinal ribs extending from the first section and wrapping around an end of the filter,
an overmold injection molded onto the filter comprising a first portion and a second portion, a flexible knee connecting the first portion to the second portion, and
a first cylindrical section and a second cylindrical section connected by a flexible knee, the first and second cylindrical sections including perforations,
wherein the internal space is configured to receive cryogenic fluid through the filter, allow cryogenic fluid to flow through the internal space and exit through the open end thereof.

2. The filter apparatus of claim 1, wherein the support comprises the outer cage, the support further comprising first snaps associated with the outer cage and second snaps associated with the filter, wherein the first snaps mutually engage respective second snaps thereby securing the filter to the outer cage.

3. The filter apparatus of claim 2, wherein the first snaps are secured to at least one of the longitudinal ribs and/or at least one of the annular ribs.

4. The filter apparatus of claim 1, wherein the filter apparatus further comprises a sleeve, the open end of the filter fluidly sealed with an end of the sleeve.

5. The filter apparatus of claim 1, wherein the filter further comprises a mesh filtering medium, a pleated filtering medium, a corrugated filtering medium or a sintered filtering medium.

6. The filter apparatus of claim 1, wherein the filter further comprises a mesh filtering medium having metal strands.

7. The filter apparatus of claim 1, wherein the filter is formed in the shape of an elongated bag or sock.

8. A filter apparatus for a cryogenic fluid comprising:
a filter comprising an internal space and an open end; and
a support associated with the filter for maintaining a volume of the internal space above a predetermined value, the support comprises an overmold injection molded onto the filter, the overmold comprising at least a first section and a second section fluidly sealed with each other, the first and second sections each comprising a first portion and a second portion and a flexible knee connecting the first portion to the second portion, the first and second portions each comprising part of the filter,
wherein the internal space is configured to receive cryogenic fluid through the filter, allow cryogenic fluid to flow through the internal space and exit through the open end thereof.

9. The filter apparatus of claim 8, wherein the first section and the second section are ultrasonically welded to each other.

10. The filter apparatus of claim 1, wherein the support includes the first cylindrical section and the second cylindrical section connected by the flexible knee, wherein the filter overlays the first and second cylindrical sections.

11. A filter apparatus for a cryogenic fluid comprising:
a filter comprising an internal space and an open end; and
a support associated with the filter for maintaining a volume of the internal space above a predetermined value, the support including a first cylindrical section and a second cylindrical section connected by a flexible knee, wherein the filter is a pleated-type filter or a corrugated-type filter,
wherein the internal space is configured to receive cryogenic fluid through the filter, allow cryogenic fluid to flow through the internal space and exit through the open end thereof.

12. A method for filtering cryogenic fluid comprising:
employing a filter in a form of a flexible mesh to filter particles having a maximum dimension that is at least one of 10 microns, 5 microns and 2 microns, the filter including an internal space and an open end; and
employing a support to maintain a volume of an internal space of the filter above a predetermined value, the support including at least one support selected from:
a coil spring arranged in the internal space of the filter,
a tent-type structure comprising a frame with flexible rods,
a cage spanning at least a portion of an outer surface and an inner surfaces of the filter,
an outer filter on an outer surface of the filter and an inner filter on an inner surface of the filter,
an outer cage comprising a first section and a second section, the first section comprising annular ribs and longitudinal ribs, the second section comprising longitudinal ribs extending from the first section and wrapping around an end of the filter,
an overmold injection molded onto the filter comprising a first portion and a second portion, a flexible knee connecting the first portion to the second portion, and
a first cylindrical section and a second cylindrical section connected by a flexible knee, the first and second cylindrical sections including perforations; and
flowing the cryogenic fluid through the internal space of the filter and through the open end of the filter.

13. The method for filtering cryogenic fluid of claim 12, further comprising arranging the filter around a fluid inlet of a cryogenic pump such that the internal space is separated from a cryogen space of a cryogenic storage vessel by the filter, wherein the fluid inlet is in selective fluid communication with a compression chamber of the cryogenic pump.

14. The method for filtering cryogenic fluid of claim 13, wherein the cryogenic pump comprises a cylinder and a piston reciprocating therein, the piston dividing the cylinder into the compression chamber and a backside chamber, the method further comprising:

arranging the filter over a port in the cryogenic pump allowing fluid communication between the backside chamber and outside the cryogenic pump;

wherein the internal space includes the backside chamber.

15. A filter apparatus for a cryogenic fluid comprising:
a filter comprising an internal space and an open end; and
a support associated with the filter for maintaining a volume of the internal space above a predetermined value, the support comprising a cylindrical section including perforations that allows the cryogenic fluid to cross the cylindrical section, wherein the filter is connected with the cylindrical section, wherein the internal space is configured to receive cryogenic fluid through the filter, allow cryogenic fluid to flow through the internal space and exit through the open end thereof.

16. The filter apparatus of claim 15, wherein the filter further comprises a mesh filtering medium, a pleated filtering medium, a corrugated filtering medium or a sintered filtering medium.

17. A pumping and filter apparatus for a cryogenic fluid comprising:
a filter apparatus; and
a cryogenic pump comprising:
a piston reciprocating within a cylinder, the piston dividing the cylinder between a compression chamber and a back-side chamber;
a fluid inlet in fluid communication with the compression chamber through a check valve; and
a port allowing fluid communication between the back-side chamber and the cryogenic fluid outside of the cryogenic pump upstream of the check valve, wherein the filter apparatus is connected with the cryogenic pump such that the internal space is defined by the filter and the cryogenic pump and includes the fluid inlet of the compression chamber and the port of the back-side chamber, whereby fluid exiting the back-side chamber through the port during reciprocating motion of the piston remains within the internal space of the filter.

\* \* \* \* \*